(No Model.) 2 Sheets—Sheet 1.

J. SMITH.
BRAKE FOR VEHICLES.

No. 414,597. Patented Nov. 5, 1889.

Witnesses: J. A. Rutherford, Robt. Everett

Inventor: Jabez Smith, By James L. Norris, Attorney (No Model.) 2 Sheets—Sheet 2.

J. SMITH.
BRAKE FOR VEHICLES.

No. 414,597. Patented Nov. 5, 1889.

UNITED STATES PATENT OFFICE.

JABEZ SMITH, OF BRADFORD, COUNTY OF YORK, ENGLAND.

BRAKE FOR VEHICLES.

SPECIFICATION forming part of Letters Patent No. 414,597, dated November 5, 1889.

Application filed February 27, 1889. Serial No. 301,416. (No model.) Patented in England March 31, 1888, No. 4,858.

*To all whom it may concern:*

Be it known that I, JABEZ SMITH, a subject of the Queen of Great Britain and Ireland, residing at Bradford, in the county of York, England, have invented certain Improvements in Brakes for Tram-Engines, Cars, Vehicles, and the Like, (for which I have obtained Letters Patent in Great Britain, No. 4,858, dated March 31, 1888,) of which the following is a specification.

This invention has for its object the more effectual braking of tram-engines, cars, vehicles, and the like in cases of emergency.

Hitherto the means employed in order to bring a tram-engine and car to a stand is to brake all the wheels on the engine and car by means of hand or steam brakes. It is well known, however, that when a high speed of the engine and car has been obtained, coupled with the weight of the same, the momentum is such as to cause the wheels to "skid," thereby leading to accidents in life or limb, which it is the object of my invention to prevent.

The invention consists in mounting a brake on the engine, car, or other vehicle, which, when brought into operation, bears upon the paving-stones or roadway between the lines, the brake-block being composed of metal having its face corrugated, or with rollers so mounted in the brake-frame that when the brake is applied the brake-block will be pressed upon the roadway, or the rollers compressed between the roadway and a plate, by which the rotation of the rollers and motion of the vehicle is retarded, the brake being applied by a handle similar to what is used in connection with brakes of the ordinary description.

Figure 2:
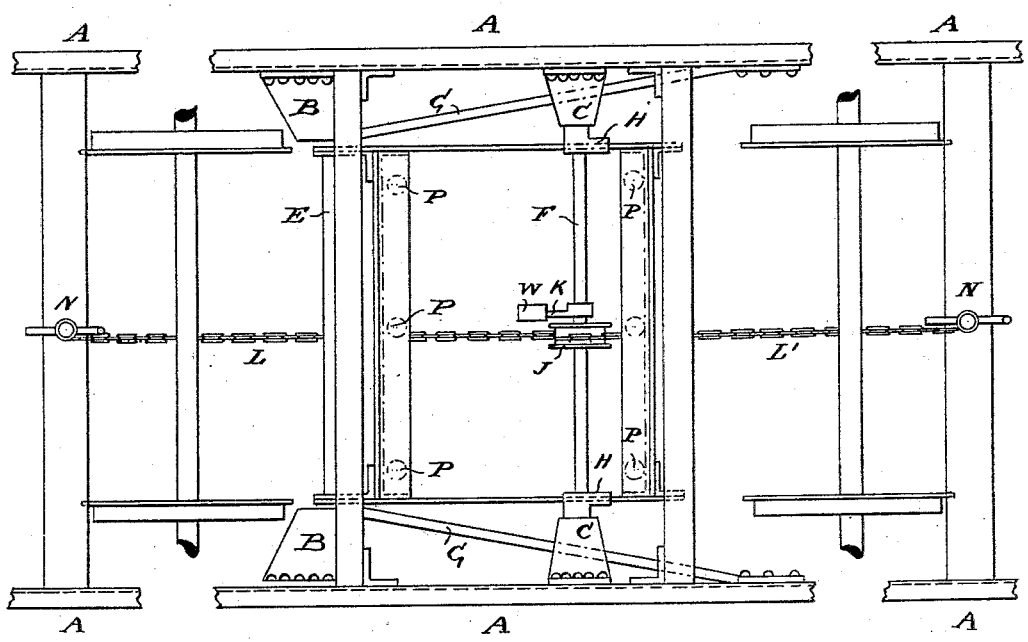
Figure 3:
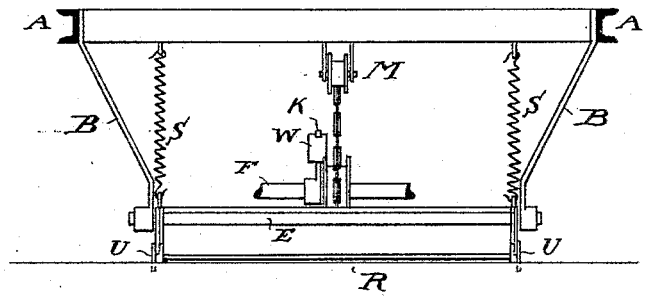
Figure 4:
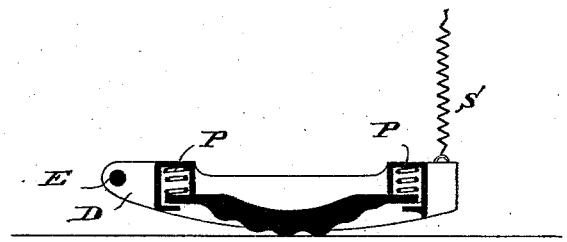
Figure 5:
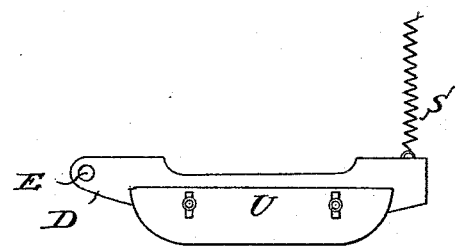

In the accompanying sheets of drawings, Figure 1, Sheet 1, represents a side view of my improved brake as applied to the sole frame-girders of a tram engine or car, the guide-plate, hereinafter described, being removed from the brake-frame in order to more clearly illustrate the apparatus. Fig. 2 is a plan of the same; Fig. 3, Sheet 2, an end view looking in the direction of the arrow. Fig. 4 is a section through the brake-frame having a corrugated brake-block in the place of rollers, and Fig. 5 is a view of the brake-frame with the guide-plate in position.

To the sole frame-girders A of an engine or car I secure in any convenient manner the brackets B and C, the former pair of brackets supporting one end of the brake-frame D by the shaft E, which passes through brackets B and the side frame-plates of the brake-block, the other end being suspended by the spiral springs S. The pair of brackets C support cam-shaft F, and, in addition to being secured to the sole frame-girders A, are connected to the respective brackets B and to another portion of the sole frame-girders A by stay-bars G, thereby giving rigidity to the same.

On the cam-shaft F are secured two cams H H in position over the side frame-plates of the brake D, each cam H having by preference a projecting stop at H', and on the said shaft are also secured a chain-pulley J and a lever K, the latter having an adjustable balance-weight W thereon.

Figure 1:
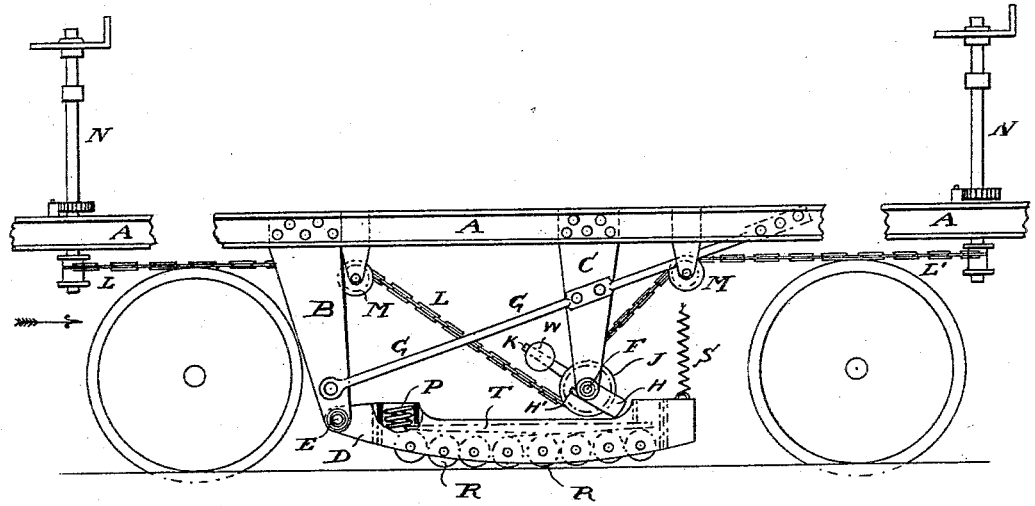

To the pulley J may be attached two chains L and L', each chain passing over a guide-pulley M to its respective ordinary brake-shaft N at one or the other end of the engine or car, so that on turning either shaft N in order to apply the brake the chain is wrapped thereon, and, the cams H H being actuated in the direction of the curved arrow, on coming in contact with the respective side frame-plates, as shown by Fig. 1, the brake is lowered until the under side is in contact with the surface of the ground, thereby checking the vehicle in its motion, the stops H' being so placed that the cams H H cannot be turned too far and thereby render the brake non-effective when applied.

The brake-block that is to come in contact with the surface of the road may be a corrugated plate, as illustrated by Fig. 4, Sheet 2, the corrugations being on the under side and the plate mounted in the side frames, so that when applied for stopping the vehicle the spiral springs P at each end of the brake-frame are compressed, thereby reducing the vibration and allowing for irregularities of the road.

In the drawings a series of rollers R are shown mounted in the side frames, which on applying the brake in the manner as before described come in contact with the road, and are prevented from rotating freely by being pressed against the under side of the plate T, the spiral springs P yielding and thereby somewhat allowing for irregularities in the road in the same manner as when a corrugated plate is used as the brake-block. On the reversal of the motion of brake-shaft N the weight W on lever K causes the pulley J to return to its normal position, thus allowing the expanded spiral springs S to contract and raise the brake clear of the ground.

When the brake is applied in the manner before described, the tendency with a light vehicle is to raise it from off the rails, and in order to reduce such liability I attach to each side frame-plate of the brake another plate U, and, on the brake-block being lowered in the manner before described, the bottom edge of each plate U will engage with the groove of the respective rails, thereby tending to retain the vehicle on its track. My object may also be accomplished by making the brake-block flat on the under side instead of corrugated; but, as will be readily understood, a flat surface will be more liable to skid than one that is corrugated or when fitted with rollers arranged as described.

What I claim is—

1. A vehicle-brake consisting of a brake-shoe pivoted at one end and having its other end supported and normally raised from the ground and a cam adapted to act upon said brake-shoe to press it against the ground, substantially as described.

2. A vehicle-brake consisting of a brake-shoe normally raised from the ground, a cam bearing upon said brake-shoe, and a chain connecting said cam with the brake-shaft for revolving said cam and forcing the brake-shoe against the ground, substantially as described.

3. A brake-shoe consisting of a supporting-frame, a series of rollers journaled therein and having a vertical movement, and a spring-impelled plate mounted above the rollers and adapted to bear against them when the shoe is pressed against the ground, substantially as described.

4. In a vehicle-brake, the combination, with a brake-shoe D, bracket B, and supporting-spring S, of the cams H H, pulley J, and lever K, all operating substantially as described.

In testimony whereof I have signed my name to this specification in the presence of two subscribing witnesses.

JABEZ SMITH.

Witnesses:
JNO. GILL,
J. HARRISON.